United States Patent [19]

Hindin et al.

[11] 4,342,264
[45] Aug. 3, 1982

[54] CONVERTIBLE RAIL-HIGHWAY SEMI-TRAILER FLUID SUSPENSION

[75] Inventors: Eugene Hindin, Bala Cynwyd, Pa.; Alan R. Cripe; Christopher A. Cripe, both of Richmond, Va.

[73] Assignee: Bi-Modal Corporation, Greenwich, Conn.

[21] Appl. No.: 125,505

[22] Filed: Feb. 28, 1980

[51] Int. Cl.³ .......................... B60F 1/04; B61D 3/00; B61F 13/00; B62D 61/12
[52] U.S. Cl. ................................ 105/215 C; 105/453; 267/35
[58] Field of Search .......................... 105/215 C, 453; 267/15 R, 35, 65 B

[56] References Cited

U.S. PATENT DOCUMENTS

| | | | |
|---|---|---|---|
| 1,863,575 | 6/1932 | Moncrieff et al. | 105/215 C |
| 2,056,106 | 9/1936 | Kuhn | 267/35 |
| 2,140,885 | 12/1938 | Soulis | 105/215 C |
| 2,889,785 | 6/1959 | Browne | 105/215 C |
| 2,925,791 | 2/1960 | Browne et al. | 105/215 C |
| 3,002,469 | 10/1961 | Wanner | 105/215 C |
| 3,286,657 | 11/1966 | Browne | 105/215 C |
| 3,319,952 | 5/1967 | Travers | 267/35 X R |
| 3,342,141 | 9/1967 | Browne | 105/215 C |
| 4,202,277 | 5/1980 | Browne et al. | 105/215 C |

Primary Examiner—Joseph F. Peters, Jr.
Assistant Examiner—Howard Beltran
Attorney, Agent, or Firm—Max R. Millman

[57] ABSTRACT

A rail bogie air suspension for a convertible rail-highway semi-trailer using an invaginating air bag secured between an upper air chamber member affixed to the underside of the rear frame of a vehicle and a load support leg assembly, a bumper carried by said upper air chamber member, a plate and shaft assembly spring urged towards said bumper and a pneumatically operable pin supporting said plate and shaft assembly whereby, when air is vented from the bag, air pressure is simultaneously provided which acts on a member that retracts the pin and allows the bumper plate and shaft assembly to move past the pin under the weight of the vehicle to allow the entire assembly to fully retract for the proper elevated stored position of the bogie during the highway mode.

12 Claims, 8 Drawing Figures

CONVERTIBLE RAIL-HIGHWAY SEMI-TRAILER FLUID SUSPENSION

This is related to the copending application, Ser. No. 810,120, filed June 27, 1977, now U.S. Pat. No. 4,202,277 which is directed to a convertible rail-highway semi-trailer.

Said related application covers a body which is supported by air springs on a rail wheel-set axle unit and on a highway wheel-set axle unit adjacent the rear of the body, these units being connected to the body independently of each other, and valves and conduits interconnecting a source of compressed air with the air springs to selectively inflate and deflate the air springs and thereby raise the rail wheel-set axle unit into an elevated inoperative position and lower the highway wheel-set axle unit into ground-engaging position for the highway mode and vice versa, a mechanism to lift and retain the rail wheel-set axle unit in its elevated stored inoperative position in the highway mode and a mechanism to lift and retain the highway wheel-set axle unit in its elevated stored inoperative position in the rail mode wherein the flanged rail wheels are in the track-engaging position.

The instant invention relates to the suspension of the rail wheel-set axle unit from the body.

The suspension of the rail wheel-set axle unit or bogie from the body shown and described in said related application includes invaginating air bags, each secured between a rear sill member of the body and a telescoping load support leg assembly, a rubber bumper mounted on an inner tubular member, a spring normally urging the bumper upwardly towards the rear sill member, and a bell crank operated latch bar supporting the tubular member. When air is vented from the bags to collapse the suspension, the latch bar moves out of its support position thereby allowing the leg assembly to telescope and move upward while the bumper remains in contact with the sill member permitting the rail bogie to be lifted to the elevated stored position while the vehicle is in the highway mode.

The primary object of this invention is to simplify and improve the structure and function of the rail wheel-set axle suspension of said related application as described hereinabove.

Another object of the invention is to provide a rail bogie air suspension in which the bell crank-operated latch bar of said related application is replaced by a more positive acting spring-urged bumper stop pin and pneumatic operating means whereby, when air is vented from the bag, a cylinder is simultaneously inflated which causes a member to retract the bumper stop pin against action of its spring allowing the bumper assembly to move past the stop pin under the weight of the vehicle to its fully retracted position during which the air bag is guided into the stored position in the highway mode of travel.

Another object of the invention is to provide a rail bogie air suspension which possesses many advantages of manufacturing and assembly by providing upper and lower cast or forged members to which the beads or reinforced edges of the invaginating air bag can be readily and securely clamped to provide a pressure-type seal at both ends of the bag. The upper member is welded to the rear frame of the vehicle at its underside and includes an indented portion which secures a downwardly extending rubber bumper. A bumper plate is mounted on a tubular shaft which with the bumper plate is spring urged towards the bumper.

These and other objects of the invention will become more apparent as the following description proceeds in conjunction with the accompanying drawings, wherein:

Specific reference is now made to the drawings in which similar reference characters are used for corresponding elements throughout.

Figures 1, 1A:
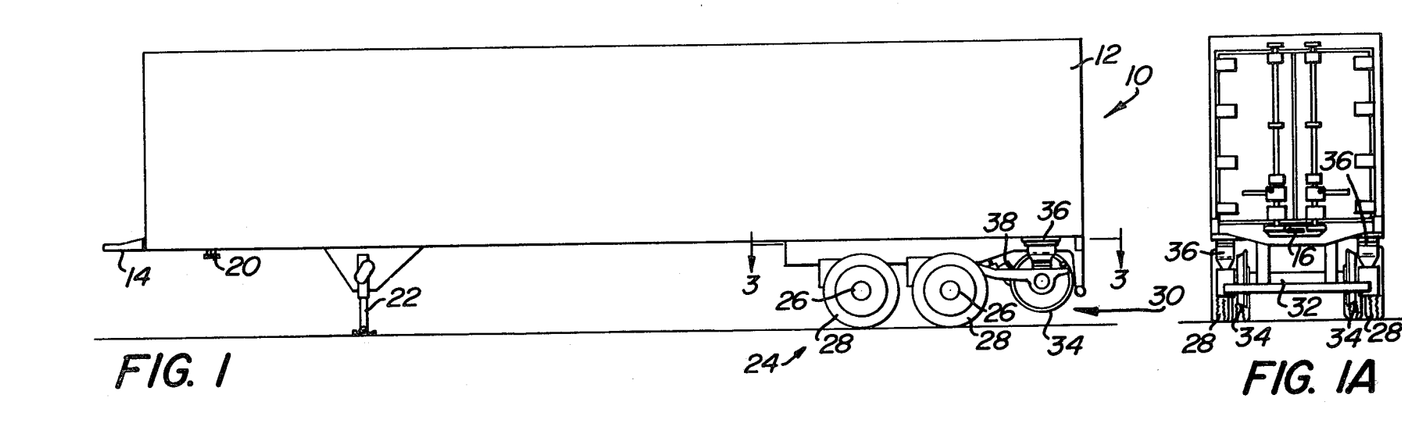
FIG. 1 is a diagrammatic side elevational view of the vehicle shown ready to be coupled to a tractor for the highway mode operation.
FIG. 1A is a rear elevational view of the vehicle in the highway mode.
Figure 2:
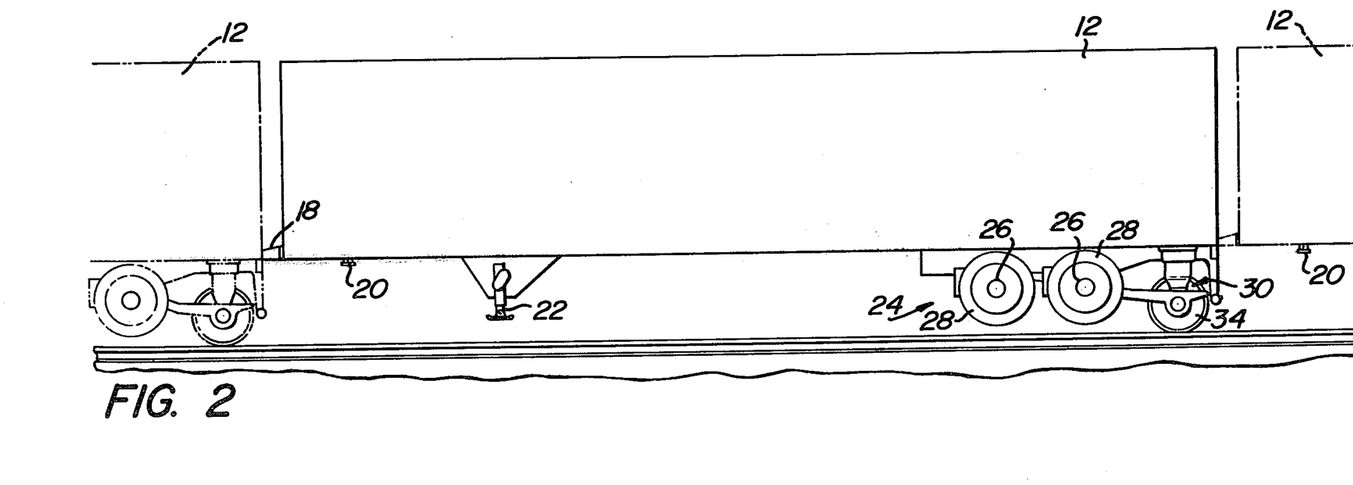
FIG. 2 is a view similar to FIG. 1 of the vehicle in the railway mode operation with the vehicles coupled end to end to form a train.

Referring first to FIGS. 1, 1A and 2, the present vehicle is generally shown at 10 and includes a body 12 of conventional semi-trailer dimensions which could be 45 ft. long, having a male coupling member 14 at its front end, and a female member 16 at its rear end to receive the male coupler of an adjacent body as at 18 to form a train for the railroad mode of operation, as seen in FIG. 2. The vehicle also includes a conventional kingpin 20 adjacent its front end for removable coupling to the fifth wheel of a tractor for the highway mode of operation, conventionally placed, telescoping semi-trailer landing gears 22, highway running gear 24 including tandem axles 26 (although a single axle suspension can be used) each axle mounting dual tired wheels 28, the running gear being suspended from the sub or underframe of the body towards the rear thereof by air-spring means later to be described, the same constituting a highway wheel-set axle unit; and a railroad bogie or rail wheel-set axle unit 30, to be described in detail later, which includes a single axle 32 mounting a pair of flanged railroad wheels 34, at appropriate rail spacing transversely, the bogie being suspended by air-springs 36 from the vehicle body behind the highway running gear 24 and including a braking mechanism 38. The arrangement is such that by appropriate operation of a pneumatic mechanism, to be described hereinafter, the air springs suspending the highway running gear may be inflated to lower the highway wheels 28 into engagement with a paved road while the air springs 36 of the railroad bogie are deflated so that the rail wheel-set axle unit or bogie may be raised into an elevated inoperative stored position as seen in FIG. 1, and by reversing this operation, the flanged railroad wheels 34 can be lowered to engage the track while the highway wheel-set axle unit is raised into an elevated inoperative stored position as shown in FIG. 2. In this latter railroad mode, the vehicle may be coupled as at 18 end to end to form a train to be pulled by a suitable locomotive. It will be understood that in the highway mode, when the highway wheels 28 engage the road and the flanged railroad wheels 34 are in the raised stored position, the landing gear 22 is in the load supporting position during which time a conventional tractor is coupled to the kingpin 20, the landing gear is telescoped to a raised position and the vehicle will then be driven as an over-the-road tractor-semi-trailer combination. The air bags supporting the body on the highway wheel-set axle unit are shown diagrammatically at 39 in FIG. 3 and are fully described in said related application Ser. No. 810,120, now U.S. Pat. No. 4,202,277.

Figure 4:
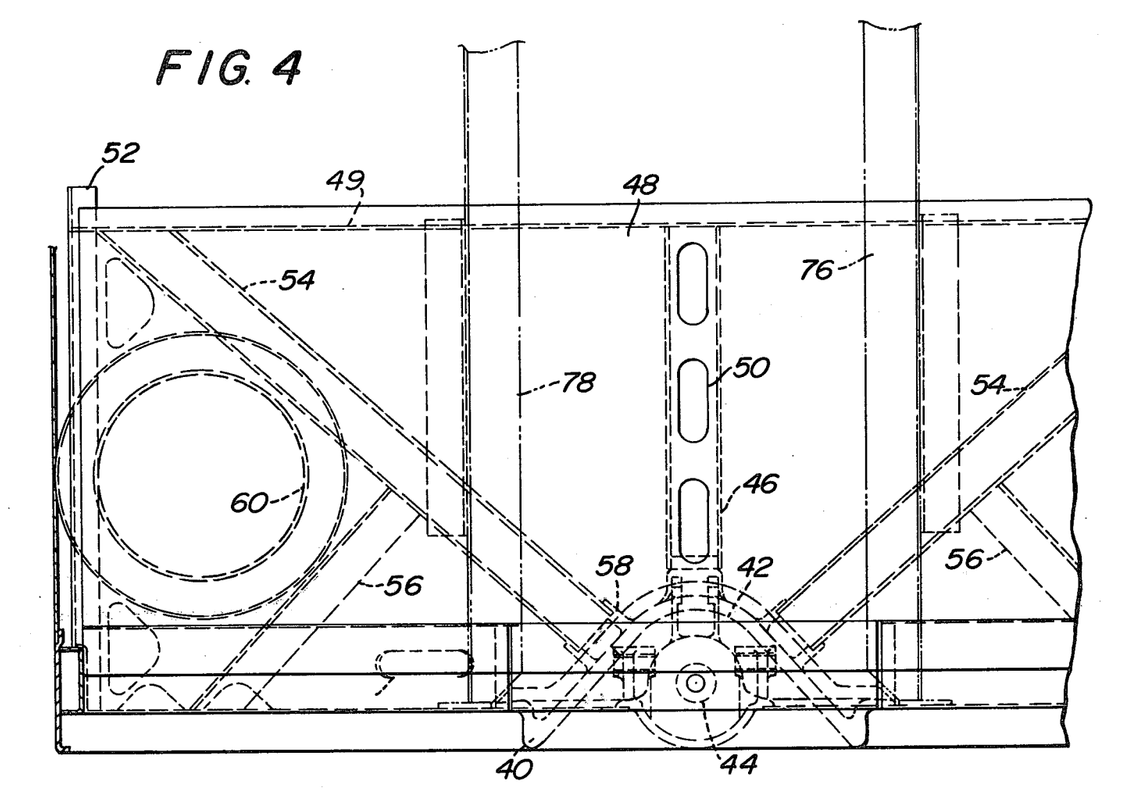
FIG. 4 is a top plan view of the rear sill construction of the vehicle.

The rear sill structure shown in FIG. 4 includes a central casting 40 of generally "T" shape when viewed from the rear, a horizontal hole or slot terminating in an arcuate wall 42 adapted to receive the male coupling member extending from the front of an adjacent vehicle, a vertical bore 44 intercepting the slot adapted to receive a coupler locking pin and other parts required to accommodate the coupler pin and locking mechanism.

Extending longitudinally from the casting 40 and secured thereto as by welding is a web member 46 shown here as a channel. The upper or top plate 48 which extends the full width of the vehicle and about 36 in. into the same is welded to the top of the channel member 46 through openings 50. Extending longitudinally on both sides of the rear sill structure for bolting to the median portion of the side rail are side channel members 52, the side edges of top plate 48 being welded thereto along the top flanges of said side channels.

A bottom plate 51 is provided which is substantially coextensive with the top plate 48 and which is spaced vertically therebeneath, the bottom plate being welded to the bottom of the central channel member 46 and to the bottom flanges of the side channel members 52 and to a vertical web member 49 at its forward edge. Thus, the top and bottom plates form, in effect, a sandwich between which are welded diagonal braces 54 and 56, the diagonal braces 54 being secured at their outer ends as at 58 to the casting 40.

Inboard of and adjacent each side of the vehicle, there is a suitable opening 60 in the bottom plate 51. It is at these two locations that the air spring assemblies 36 of the railroad bogie 30 are connected to the body structure.

Figure 3:
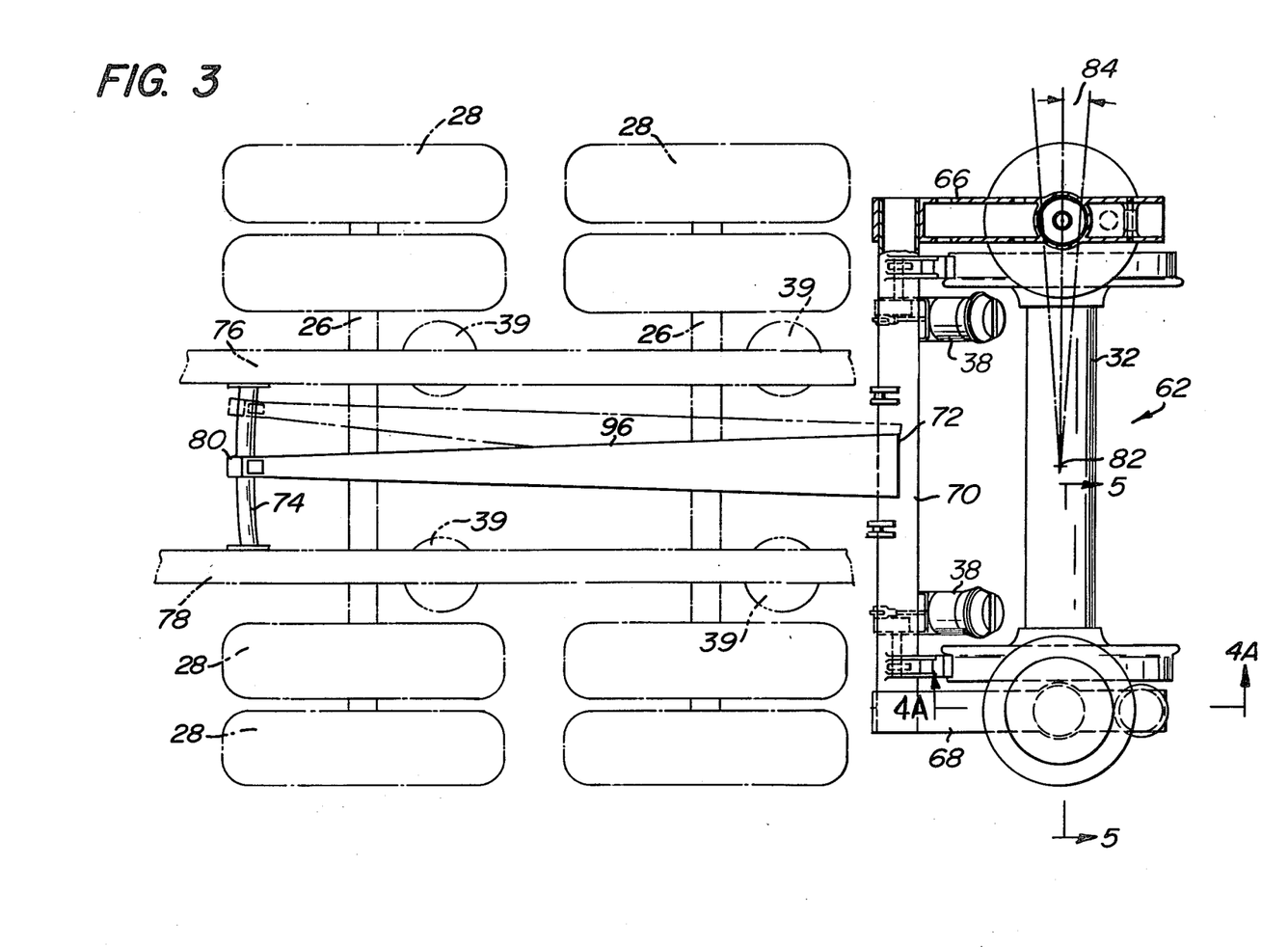
FIG. 3 is a plan view partially in section taken on the line 3—3 of FIG. 1 and showing the rail bogie with the highway axle and wheel assemblies shown in phantom.

The bogie 30 which is shown in detail in FIG. 3 comprises a yoke 62 and a longitudinally extending tubular tongue 64 which is angulated so that its forwardly extending portion overlies and clears the highway wheel axles 26. The yoke comprises transversely spaced longitudinal forwardly extending side members 66 and 68, preferably of cast hollow rectangular configuration which are connected at their forward ends by a transversely extending tubular member 70. The tongue 96 is welded to the transverse tubular member of the yoke as at 72 centrally thereof. The member 70 mounts a suitable brake mechanism 38 for each railroad wheel.

At the location of the forward end of the tongue 96, which is about 10 ft. long, an arcuate tube 74 is secured to the running gear channels 76 and 78 of the vehicle extending transversely therebetween. The forward end of the tongue is provided with a split collar 80, retained by bolts. Thus, the bogie is allowed to self steer as the front end of the tongue is allowed to slide from side to side on the arcuate tube 74 so that the rail axle 32 is free to rotate about a vertical axis 82 at its center. The steering angle is limited by the length of the arcuate member 74 and is shown in phantom in FIG. 3 as 84. When the railroad brakes are applied, the arcuate tube 80 supplies the longitudinal restraint, and also the vertical restraint to the forces produced by the brake torque. It will be understood that the arcuate tube 74 may be of any suitable cross-section.

Figure 4A:
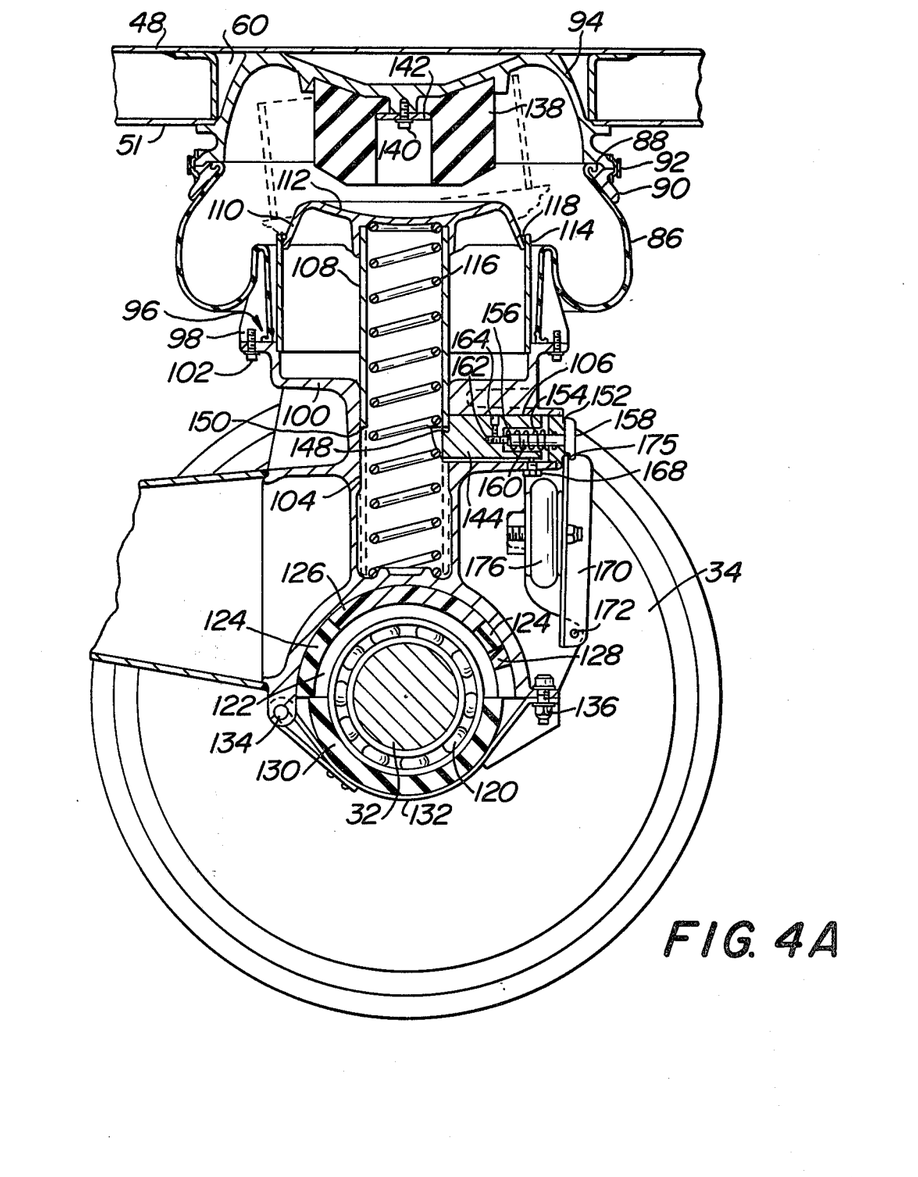
FIG. 4A is an enlarged vertical sectional view of the suspension taken on the line 4A—4A of FIG. 3.
Figure 4B:
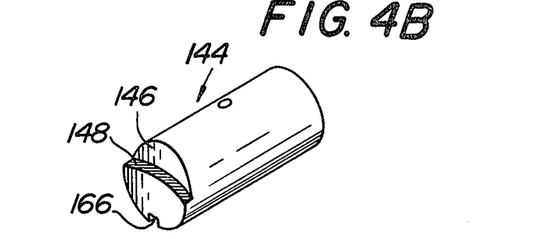
FIG. 4B is a perspective view of the support pin of the suspension.
Figure 5:
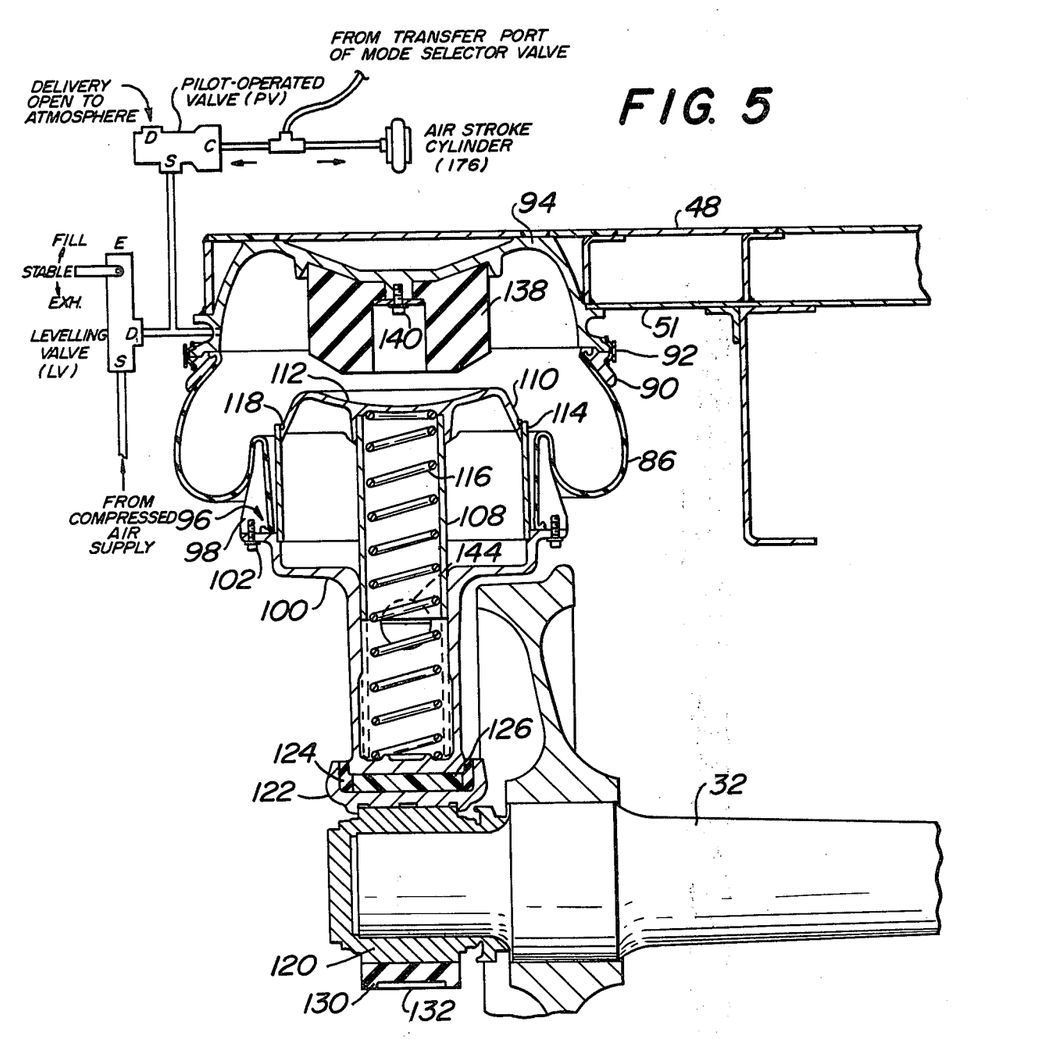
FIG. 5 is a sectional view taken on the line 5—5 of FIG. 3 including a diagram of the applicable air circuitry.

Coming now to the rail suspension of the instant invention as shown in FIGS. 4A, 4B and 5, the same is basically an air spring which, in addition to its primary function of isolating the vehicle body from shocks produced at the wheels, also maintains a constant load height, incorporates provision for supporting the body in the event of air supply failure, and is capable of being retracted into a stored position.

An invaginating air bag (sometimes known as a rolling sleeve type) 86 is provided which has an upper bead 88. A metal ring 90 engages the upper bead which is clamped by a Marman clamp 92 to a metal casting 94 which is fixed in the opening 60 and serves as an upper air spring chamber. At the lower bead 96 of the bag, the lower bead retainer 98 is bolted to the main rail suspension casting 100 by a circular pattern of about 12 bolts 102 compressing the lower bead 96 between these surfaces. Thus, a pressure-tight seal is provided at both of the bag beads.

The main casting 100 includes a vertical bore 104 and a horizontal bore 106 opening into the vertical bore 104. Slidable in the bore 104 is a hollow shaft 108 to the top of which is secured a bumper plate 110 having an upper indented surface 112. Lateral support for the bumper plate 110 and shaft 108 is provided by cylinder 114 which is welded at its lower edge to the main casting 100, and by the bore 104 in the casting 100. The bumper plate 110 and the shaft 108 are constantly urged to their uppermost position by the plunger spring 116 which is interposed between the bumper plate 110 and a spring seat at the lower wall of the bore 104 of the casting 100. The upward motion of the bumper plate and shaft assembly is limited by the retaining ring 118 at the upper end of the cylinder 114.

The axle assembly retention mechanism is an integral part of the air suspension since it incorporates an initial stage of shock isolation. The retention mechanism includes a journal bearing 120 which is pressed on the axle 32 and is retained on its upper two quadrants by housing 122 which is isolated from the main casting 100 by journal rubber 124 which is the initial spring element. The rubber portion is cut out in several areas to receive materials of different spring rates. Immediately above the journal housing 122 is a rectangular pad 126 of a reinforced elastomer such as "TICO" available from Textile Industrial Components Ltd. of Surrey, England which is firmer than the rubber and has excellent damping properties. This comes into play after initial compression of the rubber since it is slightly thinner than the rubber. At about 1½" above the horizontal center line and on the vertical transverse center line are two discs 128 of material harder than the rubber and "TICO", which pads are also slightly thinner than the rubber. These pads prevent the axle from moving horizontally under pressure from the brake shoe or under impact from track interruptions such as switches, etc.

Below the journal 120 is lower journal rubber 130 and a retainer strap 132 held in place by pin 134 and bolts and nuts 136 all of which function to keep the journal, axle and wheel in their proper positions.

Fastened to the upper airspring chamber 94 is a reinforced rubber bumper 138 which is held in place by bolt 140 and associated washer and lock washer 142. Slidable in the horizontal bore 106 of the main casting 100 is a bumper stop or support pin 144 whose inner end is recessed to form a step 146 providing a supporting ledge 148. In the event of an air supply failure or rupture of the airspring bag, the weight of the vehicle will be carried by the two bumpers 138 resting on the bumper plate 110 which is rigidly secured to the shaft 108 whose lower edge 150 is seated on the ledge 148 and is therefore supported by the stop pin 144. Both the shaft 108 and pin 144 are made of strong, wear-resistant material since they may carry as much as 30,000 lbs. when supporting a loaded vehicle.

The bumper stop pin 144 is held in the horizontal bore 106 of the casting 100 by a plug 152 which is threaded into the casting and also contains O-ring seals for air retention. The bumper stop pin is constantly urged by spring 154 into the shaft support position, the spring being interposed between the plug 152 and a shoulder 156 in the pin 144. The pin 144 is urged inwardly until the head 158 of the operating rod 160 seats against the plug 152. Rod 160 is threaded into the stop pin 144 as at 162 and held in proper angular relationship by set screw 164. The stop pin 144 has an axial groove 166 which is engaged by dog point set screw 168 to insure proper angular alignment of the stop pin. The rod 160 is held in position itself by engagement of its head 158 with a lever 170 which is pivoted at its lower end as at 172 to the main casting 100. As seen in FIG. 4A, the interengagement of the lever 170 and head 158 is rendered positive by providing a recess 175 in the head 158 to receive the extended portions of the lever and head respectively.

A levelling valve LV, which is an adjustable-position, 3-way, lever-operated valve, is operatively connected to the compressed air supply and air bags 86 to maintain a constant load height. When an increased load in the body compresses the air in the bags 86 sufficiently to reduce the distance between the body and the axle 32, the levelling valve admits additional air under higher pressure into the bag thereby raising the body again to its original height. When load is removed from the body, air pressure in the bag raises the body causing the levelling valve to vent air from the bag until the pressure in the bag is reduced sufficiently to allow the body to settle down to its normal original height. Normally, the pressure in the air bags varies from about 15 psi when the vehicle is empty to about 95 psi when the vehicle is loaded to its rated capacity.

When it is desired to place the rail axle and wheelset in the raised or stored position, the mode selector valve MSV, which is a 3-position, 6-way, lever-operated valve, is moved to the transfer position which actuates a pilot-operated, 2-way, 2-position valve PV to open and vent air from the air bags 86 to the atmosphere through the delivery port D of the valve PV, allowing the weight of the vehicle to force it downward. Simultaneously, air is delivered to the airstroke cylinder 176. The pilot-operated valve is also connected to the levelling valve LV, as shown diagrammatically in FIG. 5, wherein its supply port S is communicative with the delivery port D of the levelling valve whose exhaust port is shown at E.

When air is delivered to airstroke cylinder 176, it forces the lever 170 outwardly which, via pin 152, retracts the bumper support pin 144 so that it clears the vertical bore 104 allowing the shaft 108 and plate 110 to compress spring 116 under pressure of the vehicle weight through bumper 138 whereby the vehicle reaches its fully lowered or retracted position where it is retained by a latching mechanism (not shown). During retracting, the air bags are guided into the phantom position shown in FIG. 4A by the action of the upper and lower bead retainers 92 and 98 respectively.

If the vehicle had been in the highway mode when the mode selector valve MSV was moved to the transfer position, air would be vented from the highway air bags 39 again allowing the weight of the vehicle to force it downward. Upon moving the mode selector valve MSV to the rail position, air would be delivered via pilot-operated valve PV and levelling valve LV to the rail air bags. Simultaneously, air is exhausted from airstroke cylinder 176 allowing spring 154 to return bumper support pin 144 to its original extended position when the vehicle rises to its normal height position with the rail wheels on the tracks and the highway wheel-axle unit retained in its elevated stored position so that the shafts 108 are above the ledge 148 which is now ready to support the vehicle weight in the event of bag rupture or air supply failure.

What is claimed is:

1. In a vehicle having a wheel-set axle unit, an air spring suspension for the wheel-set axle unit comprising a load support member mounted to the axle and including a vertical bore, an air chamber member secured to the underside of the vehicle frame, and invaginating air bag clamped between said load support and air chamber member, a vertical shaft slidable in said vertical bore, a plate fixed to the upper end of said shaft, spring means normally urging said shaft and plate upwardly towards the vehicle frame to a vehicle supporting position, and pneumatically operable means holding said shaft in said support position and retractable to a release position which allows retraction of said shaft when air is vented from said air bag.

2. In a vehicle having a wheel-set axle unit, an air spring suspension for the wheel-set axle unit comprising a load support member mounted to the axle and including a vertical bore, an air chamber member secured to the underside of the vehicle frame, an invaginating air bag clamped between said load support and air chamber member, a vertical shaft slidable in said vertical bore, a plate fixed to the upper end of said shaft, spring means normally urging said shaft and plate upwardly towards the vehicle frame to a vehicle supporting position, and pneumatically operable means holding said shaft in said support position and retractable to a release position which allows retraction of said shaft when air is vented from said air bag wherein said pneumatically operable means includes a horizontal bore in said load support member opening into said vertical bore, a support stop pin slidable in said horizontal bore, spring means urging said pin towards said vertical bore so that its inner end engages the lower end of said shaft and supports the same in its uppermost position and means to retract said pin to said release position when air is vented from said air bag.

3. The combination of claim 2 and a bumper carried by said air chamber member adapted to bear against said plate on said shaft when air pressure is lost from the air bag.

4. The combination of claim 2 wherein said shaft is hollow and said spring means is positioned within the shaft and terminally bears against said plate and a lower portion of said load support member.

5. The combination of claim 2 wherein said means to retract said support pin includes an airstroke cylinder, a pivoted lever operatively connected to said air cylinder, and means interengaging said lever with the outer end of said support pin whereby, when air is vented from said air bag, said airstroke cylinder is simultaneously inflated, thereby pivoting said lever and pulling said support pin to the retracted position where its inner end clears the lower end of said shaft.

6. The combination of claim 2 wherein the inner end of said support pin includes a recessed portion forming a ledge engaging and supporting the lower end of said shaft.

7. The combination of claim 6 wherein said means interengaging said lever with the outer end of said support pin includes a rod connected to said support pin and a head on said rod engaged by said lever.

8. In a vehicle convertible from highway to railroad mode of travel and vice versa including a body, a highway wheel-set axle unit, air spring means supporting said body on said highway wheel-set unit, a rail wheel-set axle unit and air spring means supporting said body on said rail wheel-set axle unit; said rail wheel-set axle unit air spring means comprising a load support member mounted to the axle including a vertical bore and a horizontal bore communicating therewith, an air chamber member secured to the underside of the body, an invaginating air bag clamped between said air chamber and said load support member, a vertical shaft slidable in said vertical bore and including a plate fixed to the upper end thereof, spring means urging said shaft and plate upwardly towards said body, a supporting stop pin slidable in said horizontal bore, spring means urging said pin towards said vertical bore and in position to have its inner end engage the lower end of said support said shaft, an airstroke cylinder and a pivoted lever operative by said airstroke cylinder and engaging said support pin whereby depressuring said air bag will simultaneously increase the air pressure in said air stroke cylinder and cause said lever to retract said pin until its inner end clears the lower end of said shaft.

9. The combination of claim 8 and means to retain said ledge in angular alignment with the lower end of said shaft.

10. The combination of claim 8 wherein said air chamber member carries a bumper adapted to bear against said plate on said shaft when air pressure is lost from the air bag.

11. The combination of claim 8 wherein the inner end of said pin includes a recess forming a ledge engageable with and supporting the lower end of said shaft.

12. The combination of claim 11 wherein said angular alignment means includes an axial groove in said pin and a set screw carried by said load support member and extending into said groove.

* * * * *

UNITED STATES PATENT AND TRADEMARK OFFICE
CERTIFICATE OF CORRECTION

PATENT NO. : 4,342,264

DATED : August 3, 1982

INVENTOR(S) : Eugene Hindin, Alan R. Cripe, Christopher A. Cripe

It is certified that error appears in the above—identified patent and that said Letters Patent is hereby corrected as shown below:

Col 6, line 27, "and" should be ---an---

Signed and Sealed this

Ninth Day of November 1982

[SEAL]

Attest:

GERALD J. MOSSINGHOFF

Attesting Officer     Commissioner of Patents and Trademarks